(12) United States Patent
Miller et al.

(10) Patent No.: US 11,225,156 B2
(45) Date of Patent: Jan. 18, 2022

(54) CHARGING SYSTEM WITH THERMAL PROTECTION

(71) Applicant: Tesla, Inc., Austin, TX (US)

(72) Inventors: Allen Ham Miller, San Francisco, CA (US); Paul Guerra, Redwood City, CA (US); Pascal-Andre Fortin, Palo Alto, CA (US); Frank Spiteri, Palo Alto, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 16/035,094

(22) Filed: Jul. 13, 2018

(65) Prior Publication Data

US 2019/0030983 A1 Jan. 31, 2019

Related U.S. Application Data

(60) Provisional application No. 62/538,591, filed on Jul. 28, 2017.

(51) Int. Cl.
*H02J 7/00* (2006.01)
*B60L 53/14* (2019.01)
*B60L 53/30* (2019.01)

(52) U.S. Cl.
CPC .............. *B60L 53/14* (2019.02); *B60L 53/30* (2019.02); *H02J 7/0029* (2013.01); *H02J 7/0031* (2013.01); *H02J 7/0045* (2013.01); *H02J 7/007192* (2020.01); *H02J 7/00302* (2020.01); *Y02T 10/70* (2013.01)

(58) Field of Classification Search
CPC .... B60H 1/00271; H02J 7/047; H02J 7/0045; H02J 7/0031; H02J 7/0029; B60L 53/14; B60L 53/30
USPC ............................................................ 320/150
See application file for complete search history.

(56) References Cited

U.S. PATENT DOCUMENTS

| | | | | |
|---|---|---|---|---|
| 3,718,126 A | * | 2/1973 | Oishi ..................... | F02P 5/155 |
| | | | | 477/111 |
| 4,045,720 A | * | 8/1977 | Alexandres ........... | H02J 7/0091 |
| | | | | 320/150 |
| 4,095,100 A | * | 6/1978 | Selick .................. | H01H 61/013 |
| | | | | 250/206 |

(Continued)

FOREIGN PATENT DOCUMENTS

| | | | | |
|---|---|---|---|---|
| GB | 2239727 B | * | 5/1994 | .......... F25D 29/008 |
| JP | 02247476 A | * | 10/1990 | |
| KR | 20150066218 A | * | 6/2015 | |

*Primary Examiner* — John T Trischler
(74) *Attorney, Agent, or Firm* — Knobbe, Martens, Olson & Bear, LLP

(57) ABSTRACT

A thermal protection system includes an electrical circuit and a thermal switch. The electrical circuit transmits an electrical signal between a charge source and a charge receiver during a charging process. The thermal switch is placed in-line with the electrical circuit. The thermal switch opens above a threshold temperature to block transmission of the electrical signal. Blocking the transmission of the electrical signal causes the charging process to stop. In further examples, the charge source includes and electric vehicle charging system and the charge receiver includes an electric vehicle. In further examples, the electrical signal is required for compliance with one or more electric vehicle charging standards implemented by the electric vehicle charging system and the electric vehicle.

27 Claims, 8 Drawing Sheets

(56) References Cited

U.S. PATENT DOCUMENTS

| | | | | |
|---|---|---|---|---|
| 4,234,839 | A * | 11/1980 | King | B60L 3/0046 320/150 |
| 4,297,630 | A * | 10/1981 | Mullersman | H02J 7/0073 320/150 |
| 4,639,656 | A * | 1/1987 | Mukai | H02J 7/0073 320/155 |
| 5,576,683 | A * | 11/1996 | Rose | H01H 37/14 337/107 |
| 5,610,792 | A * | 3/1997 | DeShazo | H02H 5/044 361/101 |
| 5,629,680 | A * | 5/1997 | Makhija | G01R 31/006 324/433 |
| 6,008,624 | A * | 12/1999 | Bergstrom | H02J 7/022 320/128 |
| 6,310,465 | B2 * | 10/2001 | Najima | B60L 3/04 320/150 |
| 7,191,827 | B2 * | 3/2007 | Junge | F25D 23/061 165/263 |
| 7,413,041 | B2 * | 8/2008 | Drosendahl | B62K 9/00 180/65.1 |
| 7,433,794 | B1 * | 10/2008 | Berdichevsky | B60L 3/0046 702/130 |
| 7,683,570 | B2 * | 3/2010 | Krauer | B60L 3/0046 320/104 |
| 8,049,460 | B2 * | 11/2011 | Krauer | B60L 53/14 320/104 |
| 8,115,455 | B2 * | 2/2012 | Sellin | H01M 10/441 320/152 |
| 8,259,428 | B2 * | 9/2012 | Mollema | H02H 9/042 320/107 |
| 8,301,322 | B2 * | 10/2012 | Mitsutani | B60L 50/16 701/22 |
| 8,329,353 | B2 * | 12/2012 | Yasuda | H01M 8/04955 429/436 |
| 8,378,628 | B2 * | 2/2013 | Ichikawa | B60L 53/16 320/109 |
| 8,450,966 | B2 * | 5/2013 | Krauer | B60L 50/64 320/104 |
| 8,760,116 | B2 * | 6/2014 | Fujii | B60L 1/04 320/109 |
| 8,831,077 | B2 * | 9/2014 | Varadarajan | H04B 3/54 375/222 |
| 9,156,362 | B2 * | 10/2015 | Soden | B60L 3/04 |
| 9,159,985 | B2 * | 10/2015 | Nakanishi | H01M 2/348 |
| 9,225,190 | B2 * | 12/2015 | Labbe | H02J 7/007 |
| 9,284,935 | B2 * | 3/2016 | Kamachi | B60H 1/2218 |
| 9,308,825 | B2 * | 4/2016 | Hayashigawa | B60L 53/305 |
| 9,321,364 | B1 * | 4/2016 | Ashworth | B60L 5/02 |
| 9,335,350 | B2 * | 5/2016 | Onimaru | G01R 19/0092 |
| 9,365,123 | B2 * | 6/2016 | Flack | B60L 3/04 |
| 9,365,124 | B2 * | 6/2016 | Soden | B60L 3/04 |
| 9,421,875 | B1 * | 8/2016 | Flack | B60L 3/04 |
| 9,469,202 | B2 * | 10/2016 | Miglioranza | H02J 7/1407 |
| 9,496,722 | B2 * | 11/2016 | Yoshida | H01M 10/441 |
| 9,515,498 | B2 * | 12/2016 | Nishikawa | H02J 7/0031 |
| 9,533,599 | B2 * | 1/2017 | Soden | B60L 3/04 |
| 9,548,616 | B2 * | 1/2017 | Hermann | H01M 16/006 |
| 9,707,850 | B2 * | 7/2017 | Jefferies | B60L 11/1816 |
| 9,713,961 | B2 * | 7/2017 | Fan | B60L 11/1816 |
| 9,804,034 | B2 * | 10/2017 | Jefferies | B60L 53/18 |
| 9,827,863 | B2 * | 11/2017 | Bartz | B60L 11/182 |
| 9,981,563 | B2 * | 5/2018 | Flack | B60L 3/04 |
| 10,027,157 | B2 * | 7/2018 | Labbe | A61N 1/378 |
| 10,040,363 | B2 * | 8/2018 | Beaston | B60L 53/60 |
| 10,131,235 | B2 * | 11/2018 | Weidinger | H02J 7/047 |
| 10,205,198 | B2 * | 2/2019 | Kawano | B25F 5/00 |
| 10,227,014 | B2 * | 3/2019 | Wu | B60L 53/30 |
| 10,322,645 | B2 * | 6/2019 | Murata | H01M 10/486 |
| 10,333,318 | B2 * | 6/2019 | Flack | B60L 3/04 |
| 10,348,103 | B2 * | 7/2019 | Soden | H02J 7/0021 |
| 10,358,047 | B2 * | 7/2019 | Murata | B60K 6/48 |
| 10,369,887 | B2 * | 8/2019 | Garcha | B60L 58/27 |
| 10,377,257 | B2 * | 8/2019 | Ando | H02J 13/00007 |
| 10,411,532 | B2 * | 9/2019 | Lee | H02K 19/103 |
| 10,422,551 | B2 * | 9/2019 | Nakayama | F24H 1/0072 |
| 10,518,608 | B2 * | 12/2019 | Kamiyama | F24H 9/2028 |
| 2001/0002786 | A1 * | 6/2001 | Najima | B60L 3/04 320/108 |
| 2004/0134220 | A1 * | 7/2004 | Junge | F25D 29/00 62/440 |
| 2005/0253561 | A1 * | 11/2005 | Tibbs | H02J 7/0091 320/150 |
| 2006/0175101 | A1 * | 8/2006 | Drosendahl | B62K 9/00 180/65.1 |
| 2007/0096829 | A1 * | 5/2007 | Woong | H03F 1/52 330/298 |
| 2008/0042621 | A1 * | 2/2008 | Miglioranza | H02J 7/1407 320/150 |
| 2008/0284379 | A1 * | 11/2008 | Hirano | H01M 10/443 320/150 |
| 2009/0020346 | A1 * | 1/2009 | Krauer | H01M 10/615 180/65.1 |
| 2009/0021221 | A1 * | 1/2009 | Krauer | B60L 1/08 320/153 |
| 2009/0033294 | A1 * | 2/2009 | Odajima | H02J 7/0029 320/166 |
| 2009/0115251 | A1 * | 5/2009 | Nakamura | H01M 10/625 307/32 |
| 2009/0126100 | A1 * | 5/2009 | Kenoyer | F24H 1/0081 4/559 |
| 2009/0139781 | A1 * | 6/2009 | Straubel | B60L 50/64 180/65.1 |
| 2009/0181271 | A1 * | 7/2009 | Yasuda | H01M 8/04358 429/436 |
| 2009/0268356 | A1 * | 10/2009 | Mollema | H02H 9/042 361/37 |
| 2010/0299008 | A1 * | 11/2010 | Mitsutani | B60L 50/16 701/22 |
| 2011/0106329 | A1 * | 5/2011 | Donnelly | B60L 3/12 700/291 |
| 2011/0199047 | A1 * | 8/2011 | Fujii | B60L 1/04 320/109 |
| 2011/0216451 | A1 * | 9/2011 | Haines | B60L 53/16 361/42 |
| 2011/0216452 | A1 * | 9/2011 | Haines | H02H 3/00 361/42 |
| 2011/0216453 | A1 * | 9/2011 | Haines | H02H 9/00 361/49 |
| 2011/0267004 | A1 * | 11/2011 | Krauer | B60L 58/27 320/109 |
| 2011/0300753 | A1 * | 12/2011 | Ichikawa | B60L 3/0069 439/620.21 |
| 2012/0002714 | A1 * | 1/2012 | Varadarajan | H04B 3/54 375/238 |
| 2012/0022811 | A1 * | 1/2012 | Dickinson | B60L 53/305 702/60 |
| 2012/0040212 | A1 * | 2/2012 | Hermann | H01M 16/006 429/50 |
| 2012/0040255 | A1 * | 2/2012 | Hermann | H01M 16/006 429/407 |
| 2012/0130576 | A1 * | 5/2012 | Sugiyama | B66C 1/06 701/22 |
| 2012/0133329 | A1 * | 5/2012 | Yoshida | H01M 10/441 320/116 |
| 2012/0262115 | A1 * | 10/2012 | Ichikawa | B60L 50/16 320/109 |
| 2012/0299690 | A1 * | 11/2012 | Nakanishi | H01M 2/348 337/38 |
| 2012/0318783 | A1 * | 12/2012 | Kamachi | H05B 1/0236 219/497 |
| 2013/0106173 | A1 * | 5/2013 | Nomura | B60L 3/0046 307/9.1 |
| 2013/0201641 | A1 * | 8/2013 | Soden | B60L 3/04 361/752 |
| 2013/0300429 | A1 * | 11/2013 | Jefferies | B60L 53/31 324/511 |
| 2014/0035527 | A1 * | 2/2014 | Hayashigawa | B60L 53/305 320/109 |

(56) References Cited

U.S. PATENT DOCUMENTS

| | | | |
|---|---|---|---|
| 2014/0070761 A1* | 3/2014 | Labbe | A61N 1/3787 320/108 |
| 2014/0203777 A1* | 7/2014 | Flack | B60L 3/04 320/109 |
| 2014/0254050 A1* | 9/2014 | Haines | H02H 3/162 361/42 |
| 2015/0028019 A1* | 1/2015 | Kamachi | B60H 1/2218 219/484 |
| 2015/0028809 A1* | 1/2015 | Nishikawa | H02J 7/0031 320/109 |
| 2015/0054462 A1* | 2/2015 | Weidinger | B60L 53/14 320/109 |
| 2015/0171674 A1* | 6/2015 | Lee | H02K 1/276 318/724 |
| 2015/0210172 A1* | 7/2015 | Kanayama | B60L 3/12 320/109 |
| 2015/0352969 A1* | 12/2015 | Ando | B60L 53/18 320/109 |
| 2015/0367742 A1* | 12/2015 | Soden | B60L 3/04 320/109 |
| 2016/0031335 A1* | 2/2016 | Soden | B60L 3/04 320/107 |
| 2016/0059719 A1* | 3/2016 | Jung | B60L 11/1818 320/109 |
| 2016/0064958 A1* | 3/2016 | Jung | H02J 7/0068 320/107 |
| 2016/0082852 A1* | 3/2016 | Kim | B60L 11/1818 307/125 |
| 2016/0089988 A1* | 3/2016 | Bartz | B60L 53/305 320/108 |
| 2016/0118842 A1* | 4/2016 | Labbe | A61N 1/3787 320/150 |
| 2016/0137079 A1* | 5/2016 | Jefferies | B60L 11/1816 320/109 |
| 2016/0138980 A1* | 5/2016 | Jefferies | G01K 13/00 374/141 |
| 2016/0185234 A1* | 6/2016 | Miglioranza | H02J 7/1407 307/9.1 |
| 2016/0229305 A1* | 8/2016 | Shumaker | H04W 12/06 |
| 2016/0257218 A1* | 9/2016 | Flack | B60L 3/04 |
| 2016/0272076 A1* | 9/2016 | Fan | B60L 11/1816 |
| 2016/0305688 A1* | 10/2016 | Nakayama | F24H 1/142 |
| 2016/0318375 A1* | 11/2016 | Kamiyama | B60H 1/2218 |
| 2016/0327615 A1* | 11/2016 | Wallace | B60L 53/00 |
| 2016/0339786 A1* | 11/2016 | Dickinson | G08B 21/182 |
| 2016/0347191 A1* | 12/2016 | Hayashigawa | B60L 53/305 |
| 2017/0066340 A1* | 3/2017 | Flack | B60L 3/04 |
| 2017/0066341 A1* | 3/2017 | Soden | B60L 3/04 |
| 2017/0106764 A1* | 4/2017 | Beaston | B60L 11/1838 |
| 2017/0125760 A1* | 5/2017 | Hermann | H01M 16/006 |
| 2017/0133862 A1* | 5/2017 | Jung | H01M 10/4257 |
| 2017/0194670 A1* | 7/2017 | Kawano | B25F 5/00 |
| 2017/0326990 A1* | 11/2017 | Tokito | H01M 10/44 |
| 2017/0334301 A1* | 11/2017 | Wu | B60L 53/18 |
| 2018/0244166 A1* | 8/2018 | Flack | B60L 3/04 |
| 2019/0023130 A1* | 1/2019 | Garcha | B60L 1/02 |
| 2019/0047426 A1* | 2/2019 | Effenberger | B60L 3/0069 |
| 2019/0115766 A1* | 4/2019 | Rechel | H02J 7/0031 |
| 2019/0148963 A1* | 5/2019 | Nakao | H02J 7/0031 320/134 |
| 2019/0288525 A1* | 9/2019 | Soden | B60L 53/305 |
| 2019/0360873 A1* | 11/2019 | Zoon | G01K 7/16 |
| 2021/0070184 A1* | 3/2021 | Koolen | B60L 53/665 |

* cited by examiner

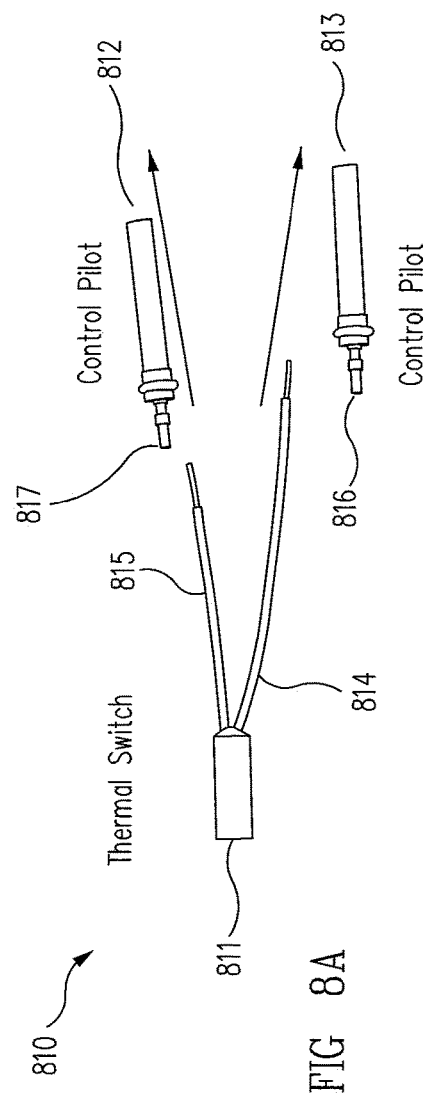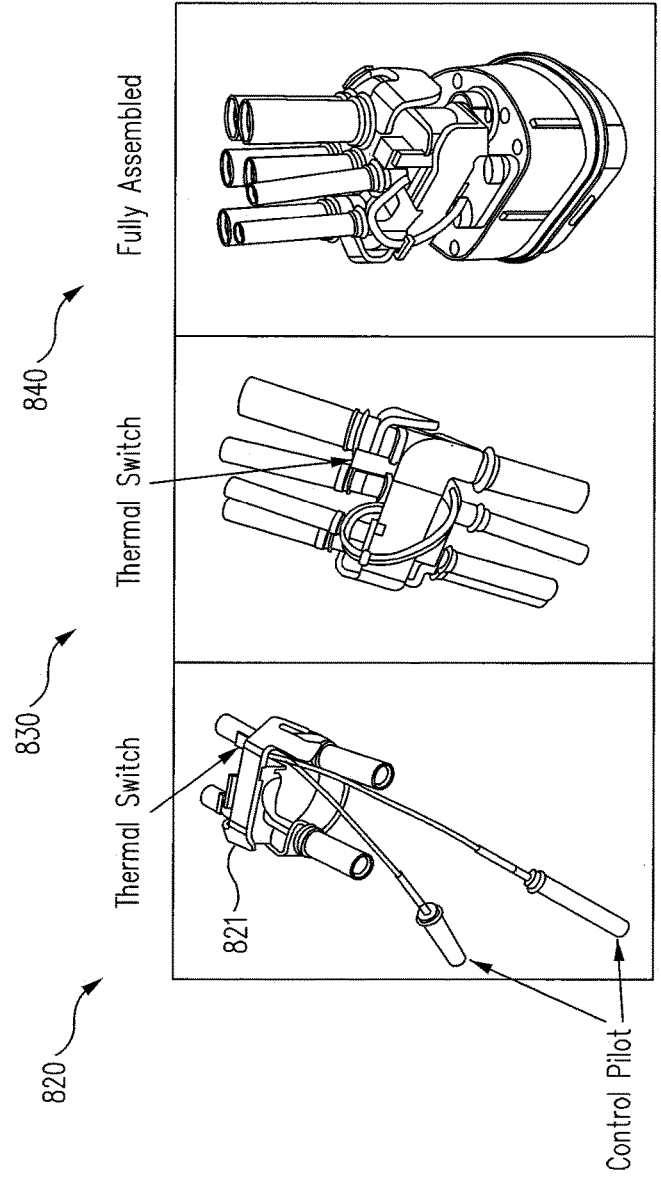
FIG. 8A
FIG. 8B

CHARGING SYSTEM WITH THERMAL PROTECTION

CROSS REFERENCE TO RELATED APPLICATION

The present application claims priority to U.S. Provisional Patent Appl. Ser. No. 62/538,591, filed Jul. 28, 2017, which is incorporated by reference in its entirety.

TECHNICAL FIELD

The present disclosure is directed to safety features for charging systems and more particularly to thermal protection systems for electric vehicle charging systems.

BACKGROUND

Electric vehicles offer numerous benefits over other types of vehicles, including vehicles that run primarily on fossil fuels. For example, electric vehicles are typically more environmentally friendly and can offer better vehicle performance and/or reliability. Thus, it is likely that electric vehicles will become increasingly commonplace in the coming years.

Electric vehicles can be recharged using various types of charging systems. However, charging electric vehicles can involve potentially dangerous levels of electric voltage and current as charge is transferred between the charging system and the electric vehicle. Abnormalities during the charging process can result in fires, damage to the electric vehicle and/or its battery, damage to the charging system, and/or personal injury to operators or bystanders. Accordingly, many charging systems include safety features to detect and/or mitigate abnormalities that occur during the charging process. As electric vehicles and their associated charging systems become more widespread, the cost, accuracy, reliability, and repeatability of these safety features become increasingly important.

Thus, it is desirable to provide systems and methods that improve the safety of electric vehicle charging systems.

SUMMARY

According to some embodiments, a thermal protection system may include an electrical circuit and a thermal switch. The electrical circuit transmits an electrical signal between a charge source and a charge receiver during a charging process. The thermal switch is placed inline with the electrical circuit. The thermal switch opens above a threshold temperature to block transmission of the electrical signal. Blocking the transmission of the electrical signal causes the charging process to stop.

According to some embodiments, a system for thermal protection of an electric vehicle charging system may include an electric vehicle charging connector and a thermal switch. The electric vehicle charging connector comprises an electrical contact. The thermal switch is coupled in series with the electrical contact. The thermal switch is configured to open when the temperature of the electrical vehicle charging connector increases above a threshold temperature.

According to some embodiments, a handle for an electric vehicle charging system may include an electrical circuit configured to transfer a signal between the handle and an electric vehicle during charging. The electrical circuit comprises a self-resetting, inline thermal switch that opens to prevent the transfer of the signal above a threshold temperature.

According to some embodiments, an adapter for an electric vehicle charging system may include an electrical circuit configured to transfer a signal between a first adapter interface and a second adapter interface during charging operation. The electrical circuit comprises an inline thermal switch that opens to prevent the transfer of the signal above a threshold temperature Summaries of embodiments are also provided by the claims that follow the description.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

FIGS. 8A and 8B are simplified diagrams of a sequence of steps for making an adapter for an electric vehicle charging system according to some embodiments.

Figure 1:
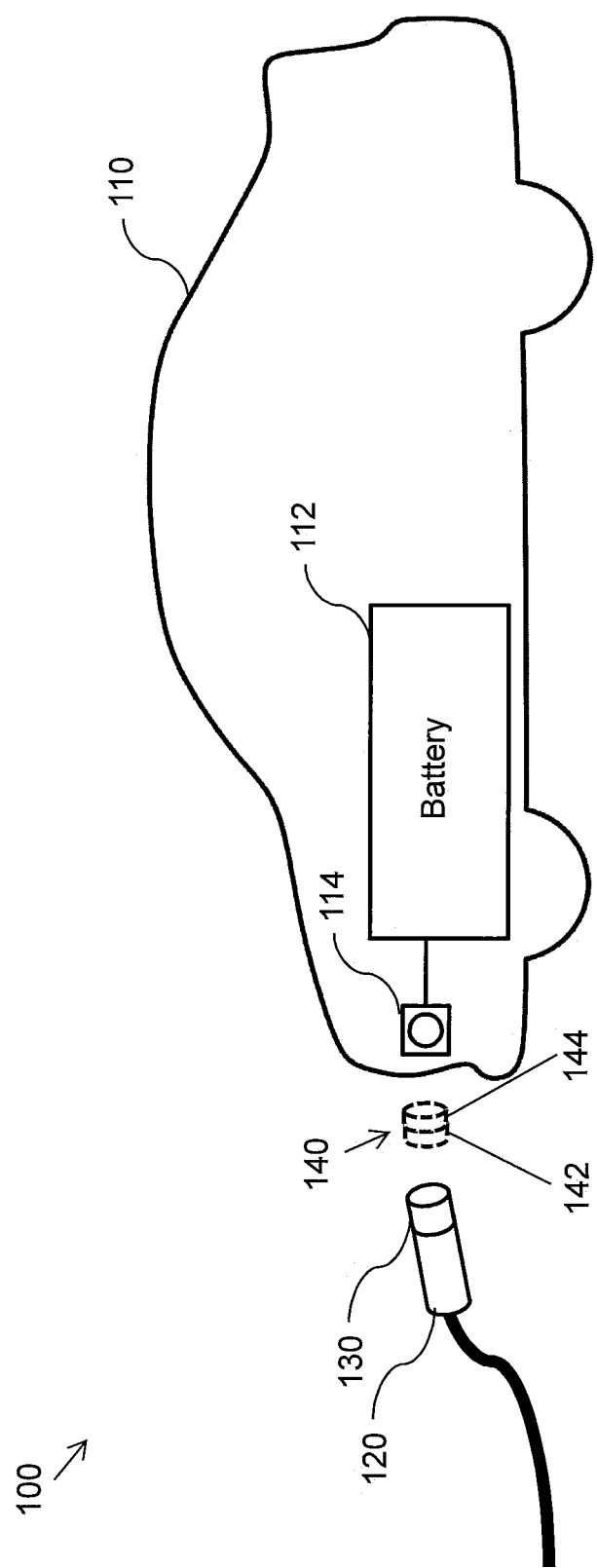
FIG. 1 is a simplified diagram of an electric vehicle charging system according to some embodiments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional. In some instances well known methods, procedures, components, and circuits have not been described in detail so as not to unnecessarily obscure aspects of the embodiments.

There are a number of ways to detect potential safety hazards in electric vehicle charging systems. One approach is to monitor the temperature of various components in the electric vehicle charging systems. In particular, a rise in temperature outside of a normal operating range can indicate an abnormality during the charging process, such as a software or hardware error, a bad electrical connection, a broken or damaged piece of equipment, and/or the like. Thus, one way to improve the safety of electric vehicle charging systems is to implement systems to terminate the charging process when a temperature outside of a normal operating range is detected. However, implementing such thermal protection systems can increase the cost and/or complexity of the electric vehicle charging system. In addition, such systems can introduce new failure modes and/or decrease the overall reliability of the electric vehicle charging system. Accordingly, it is desirable to improve the cost, accuracy, and reliability of thermal protection systems used in electric vehicle charging systems.

FIG. 1 is a simplified diagram of an electric vehicle charging system 100 according to some embodiments. Electric vehicle charging system 100 is used to charge an electric vehicle 110. Electric vehicle charging system 100 may be an AC charging system and/or a DC charging system. In some examples, electric vehicle 110 may include a fully electric vehicle, a plug-in hybrid electric vehicle, and/or any other type of vehicle capable of being charged by electric vehicle charging system 100. In some examples, electric vehicle 110 may include a battery 112 that is charged via an inlet 114.

Electric vehicle charging system 100 includes a handle 120 with a connector 130. During charging, handle 120 is coupled to inlet 114 via connector 130. This allows the transfer of data, power, and/or control signals between electric vehicle charging system 100 and electric vehicle 110. In some embodiments, connector 130 may be physically coupled to inlet 114 during charging. For example connector 130 may be manually and/or robotically plugged into inlet 114 such that connector 130 and inlet 114 are in physical contact. In some embodiments, connector 130 may be wirelessly coupled to inlet 114 during charging. For example, connector 130 and inlet 114 may be configured for wireless power transfer.

In some embodiments, inlet 114 and/or connector 130 may be compliant with one or more electric vehicle charging standards. Electric vehicle charging standards allow for interoperability between charging systems and vehicles made by different manufacturers. Examples of electric vehicle charging standards include IEC standards (e.g., IEC 62196-2:2014 for AC charging connectors and IEC 62196-3:2014 for DC charging connectors), GB/T standards (e.g., GB/T 20234.2:2015), and the CHAdeMO standard. In addition, proprietary charging systems, such as the Tesla Supercharger™ system, may also offer compatibility with electric vehicle charging standards. These standards may specify, among other things, the physical arrangement of inlet 114 and connector 130 and the communication protocols used by various signals that are transferred between electric vehicles 110 and electric vehicle charging system 100.

When inlet 114 and connector 130 implement the same electric vehicle charging standard, inlet 114 and connector 130 may be directly coupled during charging. However, when inlet 114 and connector 130 implement different electric vehicle charging standards, inlet 114 and connector 130 may be coupled via an adapter 140 during charging. According to some embodiments, adapter 140 may include two or more connectors 142 and 144 that implement different electric vehicle charging standards and facilitate interconnection among the different standards.

Figure 2:
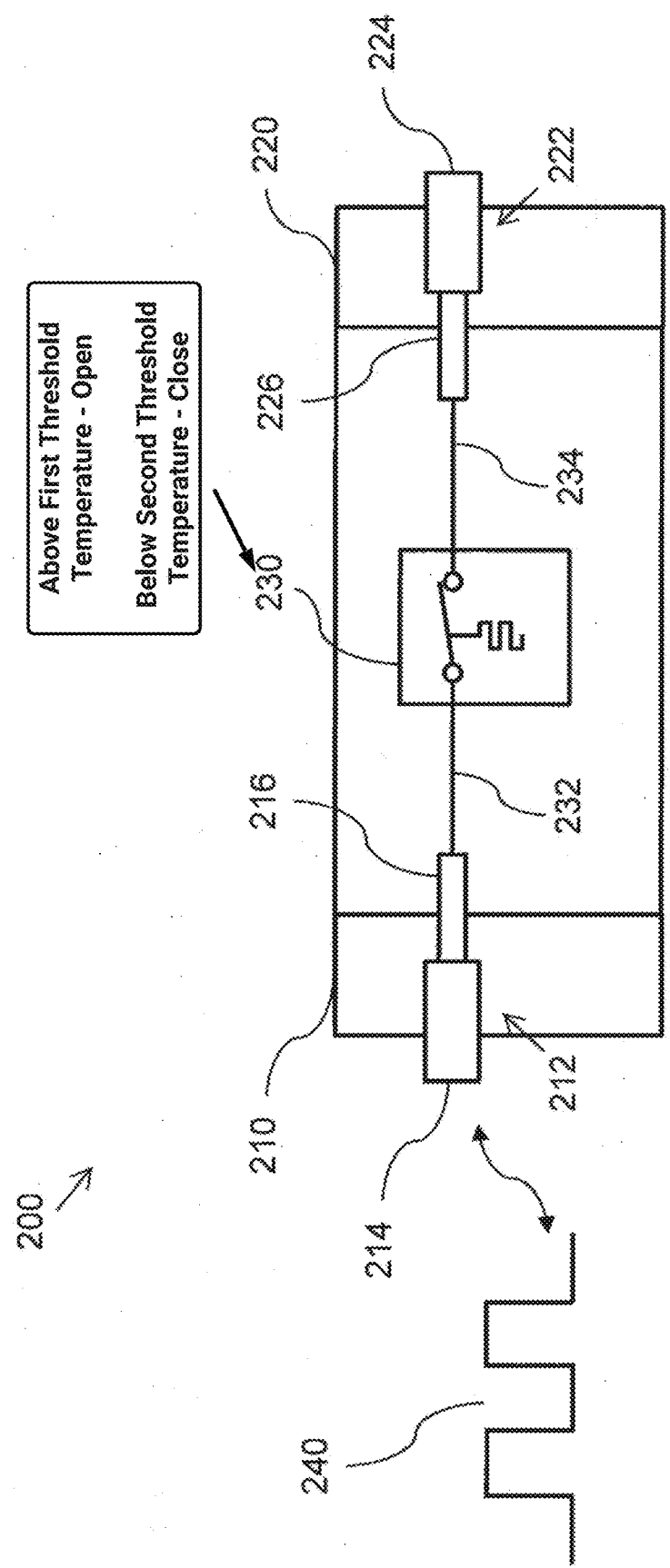
FIG. 2 is a simplified diagram of a system with inline thermal protection according to some embodiments.

FIG. 2 is a simplified diagram of a system 200 with inline thermal protection according to some embodiments. In some examples, system 200 may be incorporated into a charging circuit between a charge source (e.g., an electric vehicle charging system) and a charge receiver (e.g., an electric vehicle). According to some embodiments consistent with FIG. 1, system 200 may be incorporated into handle 120 and/or adapter 140 of electric vehicle charging system 100. Although system 200 is described primarily in the context of electric vehicle charging, it is to be understood that system 200 may be used in many other contexts. For example, system 200 may be incorporated into other types of charging circuits, such as chargers for portable electronics. More generally, system 200 may be incorporated into virtually any type of electronic system for which thermal protection is desired.

System 200 includes a connector 210, which optionally is an electric vehicle charging connector implementing a first electric vehicle charging standard. Connector 210 includes a set of one or more contacts, including a contact 212. During charging, connector 210 may be plugged into a matching inlet of an electric vehicle, such as inlet 114 of electric vehicle 110. Contact 212 includes an external interface 214 and an internal interface 216.

System 200 optionally includes a connector 220, which also may be an electric vehicle charging connector implementing a second electric vehicle charging standard. The second electric vehicle charging standard may be the same and/or different from the first electric vehicle charging standard. For example, the first electric vehicle charging standard may be the IEC 62196-2:2014 standard, and the second electric vehicle charging standard may be the GB/T 20234.2:2015 standard. It is understood, however, that many other standards (including prior and/or future generations of the IEC and/or GB/T standards) may be implemented. Like connector 210, connector 220 includes a set of contacts, including a contact 222. Contact 222 includes and external interface 224 and an internal interface 226.

When system 200 is incorporated into a handle of an electric vehicle charging system, system 200 may include a single connector 210. When system 200 is incorporated into an adapter of an electric vehicle charging system, system 200 may include two or more connectors, including connectors 210 and 220. In some embodiments, system 200 may be implemented at a different location between the electric vehicle charging system and the electric vehicle, in which case system 200 may not include any connectors. For example, system 200 may be incorporated within a cable extending between the electric vehicle charging system and the electric vehicle.

During normal charging operation, the temperature within system 200 may be expected to remain stable and/or fluctuate within a predetermined normal temperature range. However, various abnormalities during charging may cause system 200 to overheat. In some examples, overheating may occur in response to a software error or a hardware error associated with the electric vehicle and/or the electric vehicle charging system. In some examples, overheating may occur as a result of damage to and/or misuse of the electric vehicle and/or the electric vehicle charging system. For example, a poor electrical interface between connector 210 and the inlet of the electric vehicle may cause excessive resistive heating at the interface.

When system 200 overheats, it may be desirable to stop the charging process until the source of the abnormality is identified and/or the temperature returns to the normal temperature range. Accordingly, system 200 may include a thermal switch 230 that monitors the temperature of system 200 (and/or components thereof, such as connectors 210 and/or 220) and triggers the charging process to stop above a predetermined threshold temperature. As will be discussed, the placement and characteristics of thermal switch 220 may impact the level of safety, reliability, and/or accuracy provided by thermal switch 220.

Thermal switch 230 is placed in-line with an electrical circuit that transmits an electrical signal 240 between the electric vehicle and the electric vehicle charging system during charging operation. As depicted in FIG. 2, the electrical circuit is formed by contact 212, thermal switch 230, and (optionally) contact 222. Electrical signal 240 may transfer power, data, and/or control information between electric vehicle charging system 100 and electric vehicle 110 during charging. In some examples, electrical signal 240 may be unidirectional (e.g., propagating from the electric vehicle charging system to the electric vehicle or vice versa) and/or bidirectional.

In some embodiments, electrical signal 240 may correspond to a signal defined by an electric vehicle charging standard implemented by connectors 210 and/or 220. For example, electrical signal 240 may correspond to a signal that is required for compliance with the applicable standard. In some embodiments, the standard may specify that electrical signal 240 must be active for the charging operation to proceed. For example, electrical signal 240 may correspond to the control pilot signal as defined in IEC 62196-2:2014 and GB/T 20234.2:2015 standards. As specified by the IEC and GB/T standards, the loss of the control pilot signal stops charging. The control pilot signal is discussed in greater detail below with reference to FIG. 3

Placing thermal switch 230 in-line with a required signal ensures that thermal switch 230 provides robust thermal protection by stopping the charging process when opened. By contrast, if thermal switch 230 were placed in-line with a non-required signal, a situation could arise where electrical signal 240 is inactive during charging. In such a situation, thermal switch 230 would not provide adequate safety protection because blocking the already-inactive signal would not trigger the charging operation to stop. Likewise, if thermal switch 230 were placed out-of-line (e.g., in a dedicated thermal protection circuit), additional complexity and/or new failure modes could be introduced that prevent system 200 from reliably protecting against overheating. Accordingly, the safety and reliability of system 200 may be enhanced when electrical signal 240 is a required signal under one or more electric vehicle charging standards.

As depicted in FIG. 2, thermal switch 230 is coupled in series with contact 212. When system 200 includes connector 220, thermal switch 230 is coupled in series between contact 212 and contact 222. Thermal switch 230 includes a lead 232 that is electrically connected to internal interface 216 of contact 212. Thermal switch 230 additionally includes a lead 234 that is optionally connected to internal interface 226 of contact 222. In some examples, internal interfaces 216 and/or 226 may be configured as sockets that are attached to leads 232 and/or 234 by crimping.

According to some embodiments, thermal switch 230 may be implemented using a passive and/or self-resetting thermal switch. Thermal switch 230 is a normally closed (NC) type thermal switch that opens above a threshold temperature. In particular, thermal switch 230 is passively maintained in a closed state during normal charging operation to allow the transmission of the electrical signal through system 200. When the temperature of system 200 exceeds a first predetermined threshold temperature, thermal switch 230 automatically opens to block the transmission of the electrical signal. Subsequently, when the temperature of system 200 falls below a second predetermined threshold temperature, thermal switch 230 closes to restore the transmission of the electrical signal and automatically restart charging at the lower temperature. In some examples, the first and second predetermined thresholds may be the same. In some examples, the second predetermined threshold may be lower than the first predetermined threshold to introduce hysteretic behavior. The first and/or second predetermined threshold temperatures may be selected to prevent overheating while providing a sufficiently wide operating range of temperatures over which thermal switch 230 remains closed.

In some examples, thermal switch 230 may be implemented using a bimetallic thermal switch. A bimetallic thermal switch includes a bimetallic strip that automatically bends into an open and/or a closed state based on the temperature of the strip. Such bimetallic thermal switches (and other types of passive and/or self-resetting thermal switches) tend to be cheap, durable, and repeatable in terms of operating characteristics. For example, the first and second threshold temperatures of bimetallic thermal switches may be stable over time and over a number of cycles. Moreover, bimetallic thermal switches demand little maintenance once installed and add little design complexity to system 200. By contrast, thermally sensitive safety hardware with active components (e.g., a thermistor or thermocouple coupled to an active temperature sensing circuit) typically introduce extra design complexity and/or new failure modes. Accordingly, implementing thermal switch 230 using a passive and/or self-resetting thermal switch may provide improved safety, reliability, and/or accuracy. Moreover, thermal switch 230 may provide these improvements without impacting the compliance of system 200 with electric vehicle charging standards.

Figure 3:
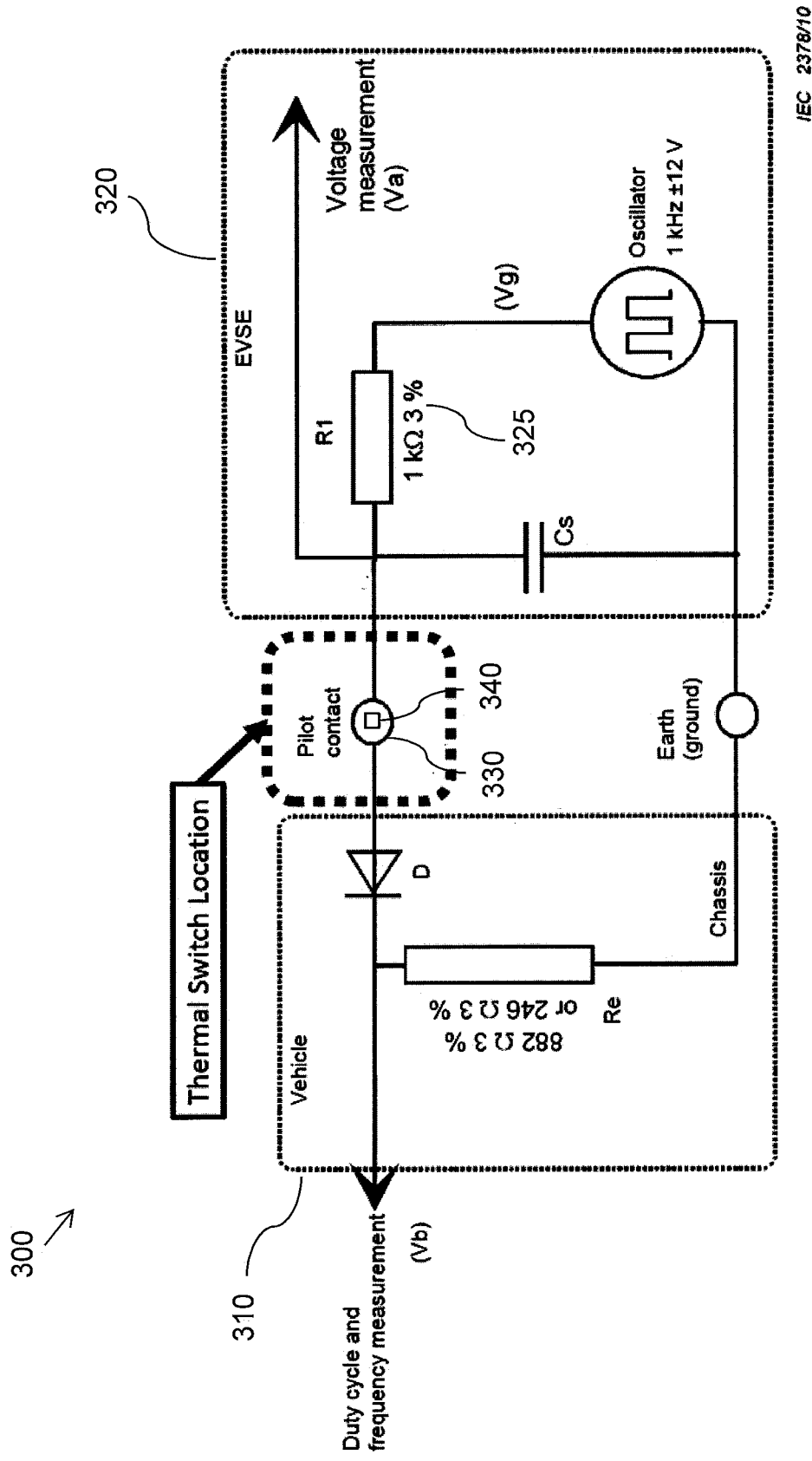
FIG. 3 is a simplified diagram of a control pilot circuit configured to transmit a control pilot signal according to some embodiments.

FIG. 3 is a simplified diagram of a control pilot circuit 300 configured to transmit a control pilot signal according to some embodiments. In some examples consistent with FIGS. 1-2, control pilot circuit 300 may be used to generate and transmit electrical signal 240 through system 200.

As depicted in FIG. 3, control pilot circuit 300 is configured to transmit the control pilot signal as defined in the IEC 62196-2:2014 and GB/T 20234.2:2015 standards. The control pilot signal is continuously transmitted between an electric vehicle 310 and electric vehicle charging system 320 during charging. Electric vehicle charging system 320 communicates the available charge current to electric vehicle 310 by modulating a 1 kilohertz square wave using pulse width modulation (PWM). Meanwhile, electric vehicle 310 requests charge current by modulating the output resistance (which registers as a change in voltage across a sense resistor 325). Thus, bidirectional communication is established. When electric vehicle 310 is disconnected from electric vehicle charging system 320, the change in voltage across sense resistor 325 drops, which signals to electric vehicle charging system 320 to terminate the charging process.

Electric vehicle 310 and electric vehicle charging system 320 are connected via a pilot contact 330. According to some embodiments, pilot contact 330 includes inline thermal switch 340 configured to monitor the temperature at or near pilot contact 330. Inline thermal switch 340 switches to an open state to disconnect electrical circuit 300 when the temperature exceeds a predetermined threshold. When inline thermal switch 340 opens, the voltage across sense resistor 325 drops in the same manner as if electric vehicle 310 were physically unplugged from electric vehicle charging system 320. Accordingly, electric vehicle charging system 320 can safely terminate the charging process in response to inline thermal switch 340 opening.

As discussed previously with reference to FIGS. 1-2, the inline thermal switch may be integrated into a handle and/or an adapter (not shown) of electric vehicle charging system 320. In preferred embodiments, inline thermal switch 340 may be passive and/or self-resetting. For example, inline thermal switch 340 may be a bimetallic thermal switch.

Figure 4:
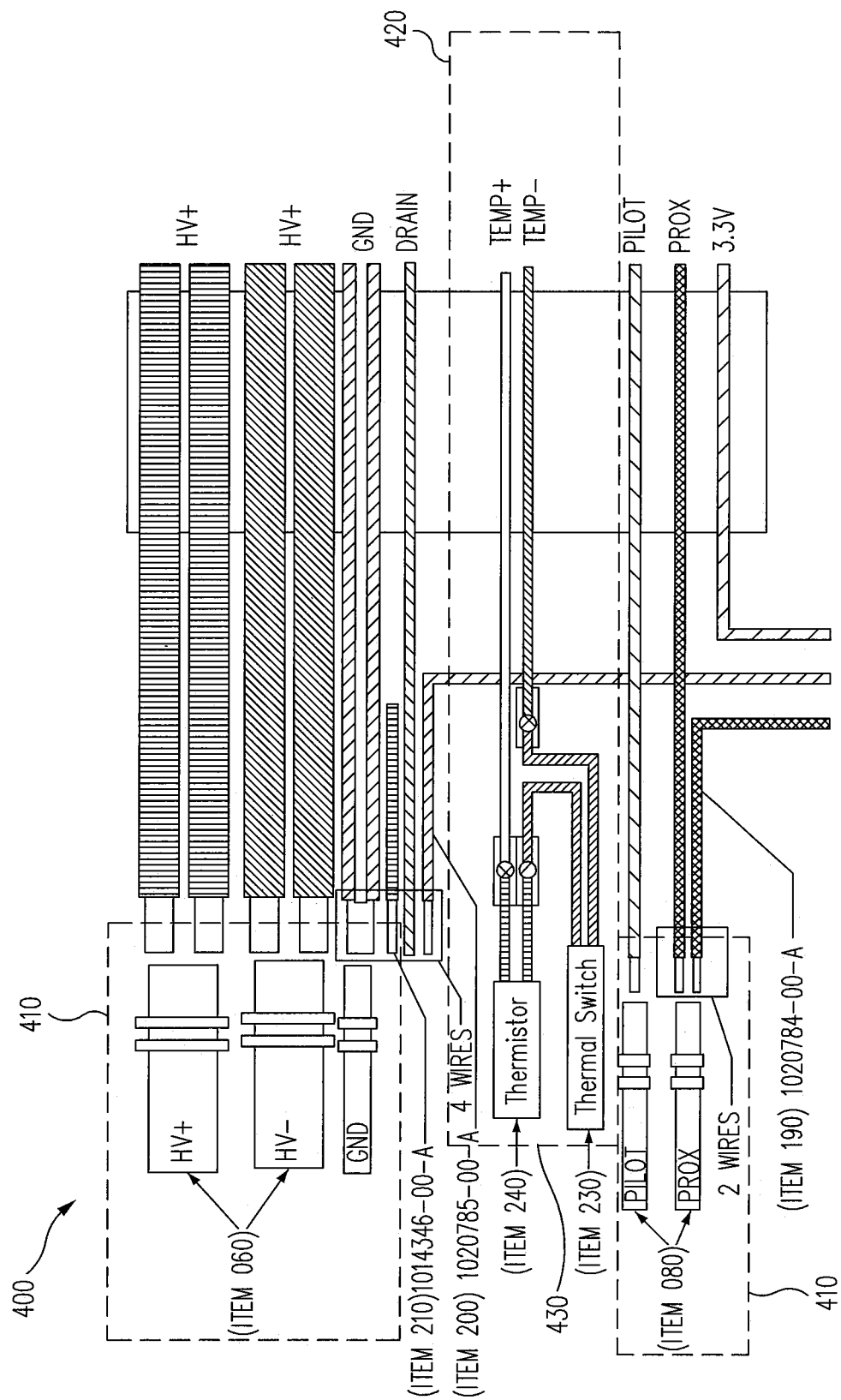
FIG. 4 is a simplified diagram of a connector system with out-of-line temperature detection according to some embodiments.

FIG. 4 is a simplified diagram of a connector system 400 with out-of-line temperature detection. Connector system 400 includes a set of contacts 410 used to transmit signals (e.g., power and/or control signals) between an electric vehicle charging system and an electric vehicle. Separately from contacts 410 and their corresponding signals, a temperature detection system 420 is used to monitor the temperature of connector 400. Temperature detection system 420 is not placed in-line with any of the signals transmitted via contacts 410; rather, it is an independent sub-system of connector system 400. Accordingly, temperature detection system 420 adds complexity and failure modes to connector system 400. Moreover, temperature detection system 420 includes a thermistor 430, which typically relies on active components to measure temperature. Such active components can increase the costs and/or limit the reliability and/or durability of connector system 400.

Figure 5:
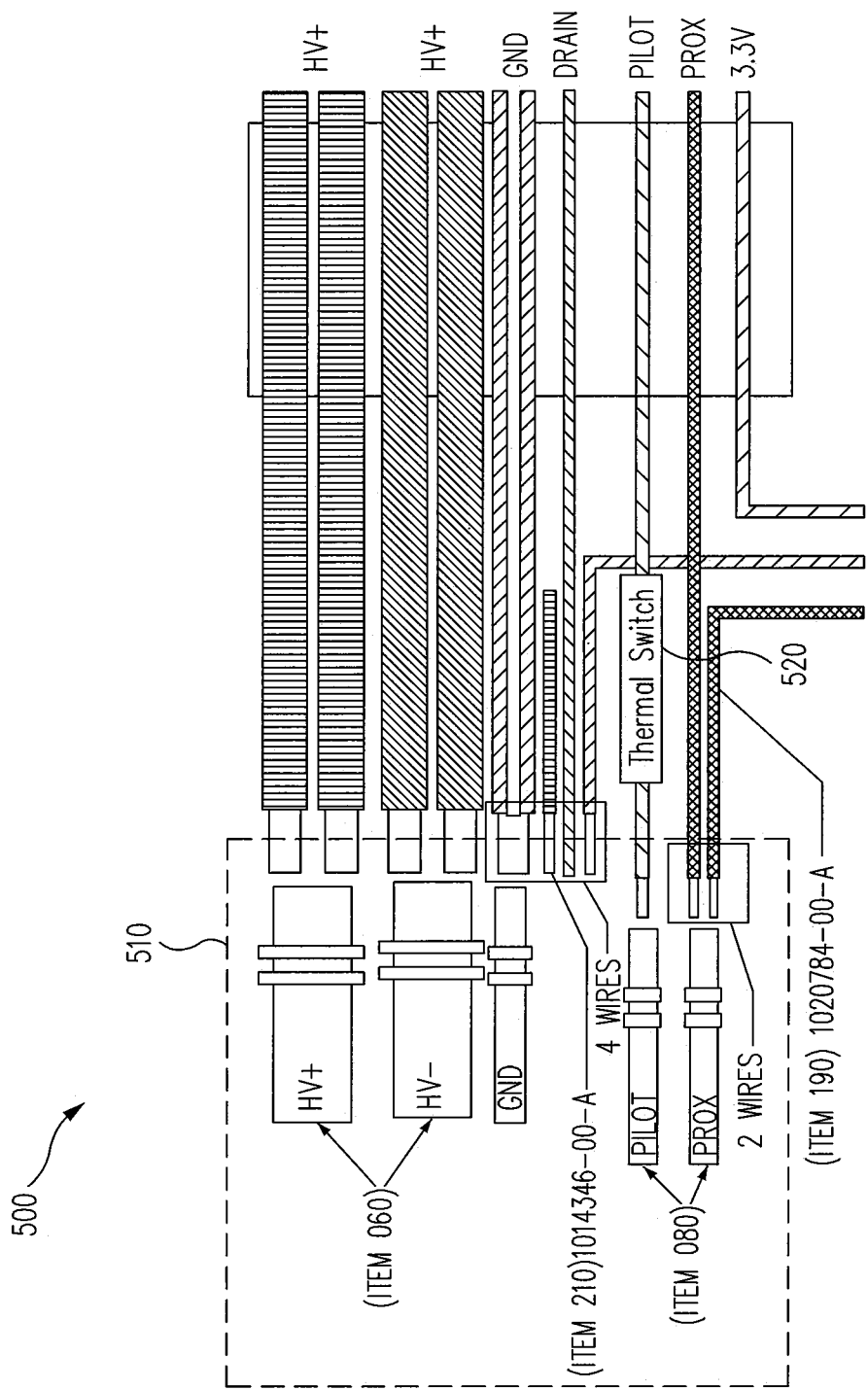
FIG. 5 is a simplified diagram of a connector system with inline temperature detection according to some embodiments.

FIG. 5 is a simplified diagram of a connector system 500 with inline temperature detection according to some embodiments. Like connector system 400, connector system 500 includes a set of contacts 510 used to transmit signals (e.g., power and/or control signals) between an electric vehicle charging system and an electric vehicle. However, unlike connector system 400, connector system 500 does not include a dedicated, out-of-line temperature detection system, such as temperature detection system 420. For example, connector system 500 does not include wiring and/or other circuit components dedicated to detecting and transmitting temperature data. Rather, connector system 500 includes an inline thermal switch 520 that is placed in series with one or more of contacts 510. In contrast to temperature detection system 420, thermal switch 520 provides thermal protection without significantly increasing the overall cost and/or complexity of connector system 500. Thus, connector system 500 may be safer, cheaper, and/or more reliable than connector system 400.

As depicted in FIG. 5, thermal switch 520 is placed in-line with the PILOT circuit, which corresponds to the control pilot circuit as described in FIG. 3. Additionally or alternately, thermal switch 520 may be placed in-line with other signaling circuits defined in the applicable standard, such as the proximity pilot circuit (PROX). In some embodiments, thermal switch 520 may be placed in-line with a charging circuit, such as HV+, HV−, and/or GND. However, the relatively high voltages and/or currents transmitted through the charging circuits may make it challenging to place a suitable thermal switch in-line with these circuits. Accordingly, placing thermal switch 520 in-line with a signaling circuit (e.g., PILOT and/or PROX) may be preferable due to the relatively low voltages (e.g., 12V) and currents used to transmit these signals.

Figures 6A, 6B:
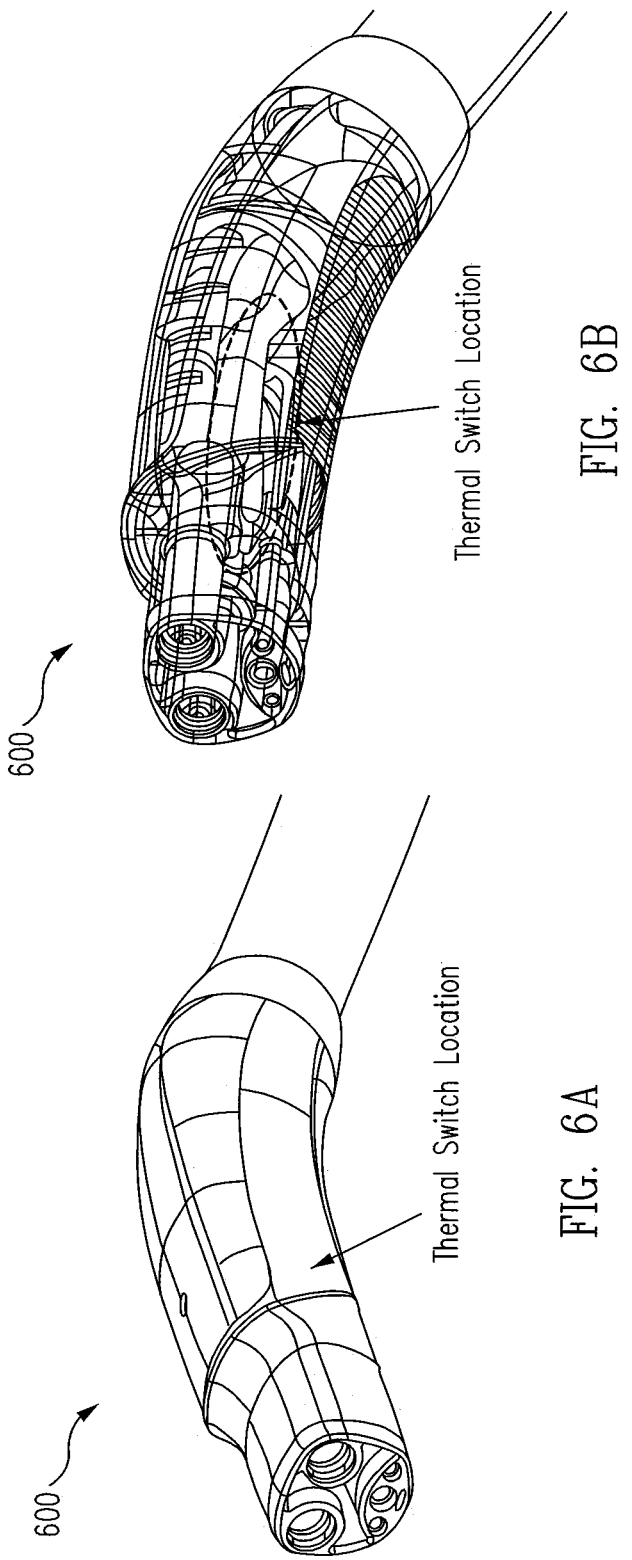
FIGS. 6A and 6B are simplified diagrams of a handle of an electric vehicle charging system according to some embodiments.

FIGS. 6A and 6B are simplified diagrams of a handle 600 of an electric vehicle charging system according to some embodiments. In some examples consistent with FIG. 1, handle 600 may be used to implement handle 120 of electric vehicle charging system 100. As depicted in FIGS. 6A and 6B, handle 600 is designed for the Tesla Supercharger™ system. However, it is to be understood that handle 600 may be designed for use in various other electric vehicle charging standards and/or proprietary systems, including AC and/or DC charging systems. As indicated, an inline thermal switch, such as thermal switch 230, is located at or near the midpoint of handle 600. It is to be understood that the inline thermal switch may be placed elsewhere in handle 600, e.g., to accommodate space constraints within handle 600 and/or to increase temperature sensitivity at particular locations within handle 600.

Figure 7B:
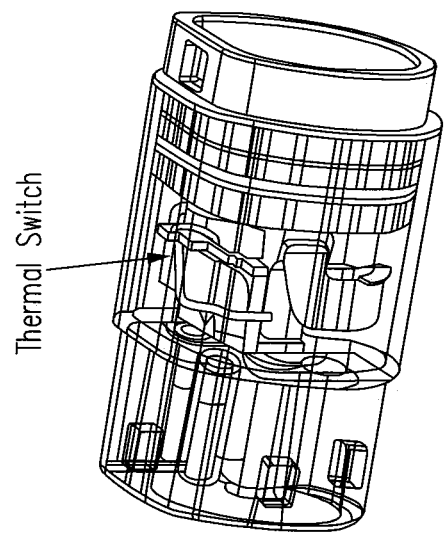
FIGS. 7A and 7B are simplified diagrams of an adapter of an electric vehicle charging system according to some embodiments.
Figure 7A:
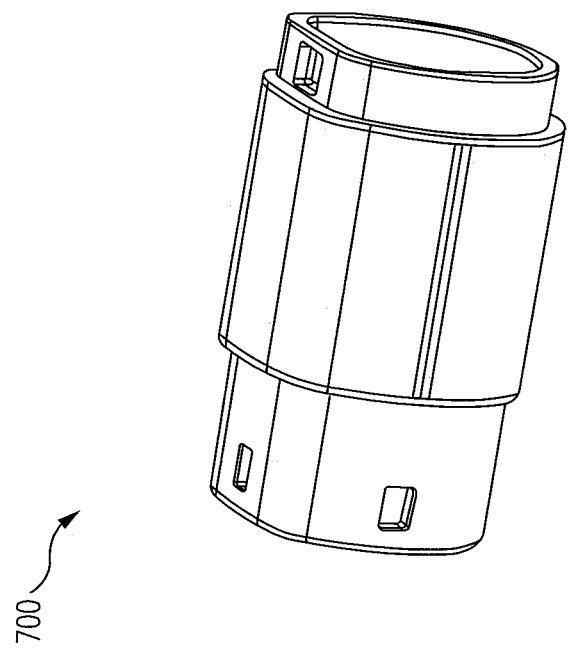

FIGS. 7A and 7B are simplified diagrams of an adapter 700 of an electric vehicle charging system according to some embodiments. In some examples consistent with FIG. 1, adapter 700 may be used to implement adapter 140 of electric vehicle charging system 100. As depicted in FIGS. 7A and 7B, adapter 700 is for AC charging and converts between the IEC 62196-2:2014 and GB/T 20234.2:2015 standards. However, it is to be understood that adapter 700 may be used to convert between various other electric vehicle charging standards and/or proprietary systems, including AC and/or DC charging systems. As indicated, an inline thermal switch, such as thermal switch 230, is located at or near the midpoint of adapter 700. It is to be understood that the inline thermal switch may be placed elsewhere in adapter 700, e.g., to accommodate space constraints within adapter 700 and/or to increase temperature sensitivity at particular locations within adapter 700.

FIGS. 8A and 8B are simplified diagrams of a sequence of steps 810-840 for making an adapter for an electric vehicle charging system according to some embodiments. In some examples consistent with FIG. 7, steps 810-840 may be performed when making adapter 700.

At step 810, an inline thermal switch 811 is mated with a pair of contacts 812 and 813. Thermal switch 811 includes a pair of leads 814 and 815, and contacts 812 and 813 include matching sockets 816 and 817. These generally correspond to similarly labeled elements described previously with reference to FIG. 2. Sockets 816 and 817 may be crimped, soldered, pasted, and/or otherwise fixedly attached to leads 814 and 815 at step 810.

At step 820, inline thermal switch 811 is mounted to an adapter frame 821. For example, inline thermal switch 811 may be mounted using a thermal paste. At step 830, the placement of contacts 812 and 813 is adjusted. The adjustments may include wrapping leads 814 and 815 around adapter frame 821 as appropriate. At step 840, adapter frame 821 is encased and/or integrated into an adapter assembly to complete the fully assembled adapter.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A thermal protection system comprising:
a pilot line electrical circuit that transmits a single pilot signal and a proximity pilot circuit that transmits a proximity pilot signal, wherein the single pilot signal and the proximity pilot signal are transmitted between a charge source and a charge receiver during a charging process;
a sense resistor coupled to the single pilot line, wherein an output voltage across the sense resistor is modulated by the charge receiver to request charge current from the charge source; and
a thermal switch inline with the pilot line electrical circuit and the proximity pilot circuit, the thermal switch being a passive thermal switch in series with the single pilot signal and the proximity pilot signal, wherein the thermal switch opens above a first threshold temperature to block transmission of the single pilot signal and the proximity pilot signal, wherein blocking the transmission of the single pilot signal and the proximity pilot signal causes the charging process to stop, and wherein the thermal switch closes below a second threshold temperature, the second threshold temperature being lower than the first threshold temperature, such that hysteretic behavior is introduced.

2. The thermal protection system of claim 1, wherein the thermal switch is self-resetting.

3. The thermal protection system of claim 1, wherein the thermal switch closes below the second threshold temperature to restore the transmission of the electrical signal, and wherein restoring the transmission of the single pilot signal and the proximity pilot signal causes the charging process to restart.

4. The thermal protection system of claim 1, wherein the thermal switch is a normally closed (NC) type thermal switch.

5. The thermal protection system of claim 1, wherein the charge source includes an electric vehicle charging system and the charge receiver includes an electric vehicle.

6. The thermal protection system of claim 5, wherein the single pilot signal and the proximity pilot signal are required for compliance with one or more electric vehicle charging standards implemented by the electric vehicle charging system and the electric vehicle.

7. The thermal protection system of claim 6, wherein the single pilot signal is a control pilot signal as defined by IEC 62196-2 and GB/T 20234.2 standards.

8. A system comprising:
an electric vehicle charging connector comprising an electrical contact, the electrical contact being configured to transmit a first signal via a single pilot line and a second signal via a proximity pilot line, wherein the first signal is configured to be modulated to establish bidirectional communication between an electric vehicle charging system and an electric vehicle, and wherein the bidirectional communication is established using resistive modulation; and
a thermal switch coupled in series with the electrical contact, such that the thermal switch is in line with the first signal and the second signal, the thermal switch being a passive thermal switch and configured to open when the temperature of the electrical vehicle charging connector increases above a first threshold temperature, wherein the thermal switch closes below a second threshold temperature, the second threshold temperature being lower than the first threshold temperature, such that hysteretic behavior is introduced.

9. The system of claim 8, wherein the electric vehicle charging connector is configured to transmit one or more of a data signal, a control signal, or a power signal.

10. The system of claim 8, wherein the thermal switch is a self-resetting thermal switch.

11. The system of claim 8, wherein the thermal switch is a bimetallic thermal switch.

12. The system of claim 8, wherein the first signal and the second signal are required to implement an electric vehicle charging standard.

13. The system of claim 12, wherein the first signal is a control pilot signal as defined in the IEC 62196-2:2014 and GB/T 20234.2:2015 standards.

14. The system of claim 8, wherein the thermal switch comprises a terminal lead and the electrical contact comprises a matching socket.

15. The system of claim 14, wherein the thermal switch and the electrical connection are fixedly coupled by crimping the socket to the terminal lead.

16. The system of claim 8, further comprising a second electric vehicle charging connector comprising a second electrical contact, wherein the thermal switch is coupled in series between the electrical contact and the second electrical contact.

17. The system of claim 16, wherein the electric vehicle charging connector implements a first electric vehicle charging standard, and the second electric vehicle charging connector implements a second electric vehicle charging standard.

18. The system of claim 17, wherein the first electric vehicle charging standard is the IEC 62196-2:2014 standard, and the second electric vehicle charging standard is the GB/T 20234.2:2015 standard.

19. A handle for an electric vehicle charging system comprising:
an electrical circuit configured to transfer a first signal via a single pilot line and a second signal via a proximity pilot line between the handle and an electric vehicle during charging, wherein the first signal is configured to be modulated to establish bidirectional communication between the electric vehicle charging system and an electric vehicle, wherein the bidirectional communication is established using resistive modulation, wherein the electrical circuit comprises a self-resetting, inline thermal switch that opens to prevent transfer of the first signal and the second signal above a first threshold temperature,
wherein the thermal switch is passive and in series with the first signal and the second signal, wherein the thermal switch closes below a second threshold temperature, the second threshold temperature being lower than the first threshold temperature, such that hysteretic behavior is introduced.

20. The handle of claim 19, wherein the first signal is a control pilot signal.

21. The handle of claim 19, wherein the thermal switch is closed during normal charging operation and opens to protect against overheating.

22. The handle of claim 19, wherein the handle does not include an out-of-line module for monitoring temperature.

23. An adapter for an electric vehicle charging system comprising:
an electrical circuit configured to transfer a first signal via a single pilot line and a second signal via a proximity pilot line between a first adapter interface and a second adapter interface during charging operation, wherein the first signal is configured to be modulated to establish bidirectional communication between the electric vehicle charging system and an electric vehicle, wherein the bidirectional communication is established using resistive modulation, wherein the electrical circuit comprises an inline thermal switch that opens to prevent transfer of the first signal and the second signal above a first threshold temperature, wherein the inline thermal switch is passive and in series with the first signal and the second signal, wherein the inline thermal switch closes below a second threshold temperature, the second threshold temperature being lower than the first threshold temperature, such that hysteretic behavior is introduced.

24. The adapter of claim 23, wherein the first signal is a control pilot signal.

25. The adapter of claim 23, wherein the inline thermal switch is self-resetting.

26. The adapter of claim 23, wherein the first adapter interface implements a first electric vehicle charging standard, and the second adapter interface implements a second electric vehicle charging standard.

27. The adapter of claim 26, wherein the first electric vehicle charging standard is the IEC 62196-2:2014 standard, and the second electric vehicle charging standard is the GB/T 20234.2:2015 standard.

* * * * *